US011043712B2

(12) United States Patent
Yang et al.

(10) Patent No.: US 11,043,712 B2
(45) Date of Patent: Jun. 22, 2021

(54) CARRIER AND BATTERY ASSEMBLY

(71) Applicant: Acer Incorporated, New Taipei (TW)

(72) Inventors: Chin-Yin Yang, New Taipei (TW);
Min-Yen Chen, New Taipei (TW);
Chia-Min Su, New Taipei (TW)

(73) Assignee: Acer Incorporated, New Taipei (TW)

(*) Notice: Subject to any disclaimer, the term of this patent is extended or adjusted under 35 U.S.C. 154(b) by 202 days.

(21) Appl. No.: 16/045,780

(22) Filed: Jul. 26, 2018

(65) Prior Publication Data

US 2019/0305267 A1 Oct. 3, 2019

(30) Foreign Application Priority Data

Mar. 30, 2018 (TW) .................................. 107111129

(51) Int. Cl.
| | |
|---|---|
| *H01M 2/10* | (2006.01) |
| *H01M 50/20* | (2021.01) |
| *H01M 50/213* | (2021.01) |
| *H01M 50/256* | (2021.01) |

(52) U.S. Cl.
CPC ......... *H01M 50/20* (2021.01); *H01M 50/213* (2021.01); *H01M 50/256* (2021.01)

(58) Field of Classification Search
CPC .. H01M 2/1005; H01M 2/105; H01M 2/1077; H01M 50/20; H01M 50/256; H01M 50/213
See application file for complete search history.

(56) References Cited

U.S. PATENT DOCUMENTS

| | | | |
|---|---|---|---|
| 2009/0233163 A1* | 9/2009 | Fang ................... | H01M 2/1022 429/99 |
| 2016/0072107 A1* | 3/2016 | Farha .................. | H01M 2/1077 318/139 |
| 2016/0247634 A1* | 8/2016 | Nieva Fatela ........... | H01G 2/04 |

FOREIGN PATENT DOCUMENTS

| | | |
|---|---|---|
| CN | 105405996 | 3/2016 |
| EP | 0875948 | 11/1998 |
| EP | 1069631 | 1/2001 |
| EP | 2690684 | 1/2014 |

* cited by examiner

*Primary Examiner* — Adam A Arciero
(74) *Attorney, Agent, or Firm* — JCIPRNET

(57) ABSTRACT

A carrier includes a body, at least one first positioning structure and at least one second positioning structure. The body has a first side wall, a second side wall and a plurality of inserting grooves, and the inserting grooves are arranged side by side and located between the first side wall and the second side wall. The first positioning structure is disposed at the first side wall, and the second positioning structure is disposed at the second side wall. A geometric profile of the first positioning structure along a direction perpendicular to the first side wall is conformal with a geometric profile of the second positioning structure along a direction perpendicular to the second side wall. A battery assembly is also provided.

9 Claims, 9 Drawing Sheets

CARRIER AND BATTERY ASSEMBLY

CROSS-REFERENCE TO RELATED APPLICATION

This application claims the priority benefit of Taiwan application serial no. 107111129, filed on Mar. 30, 2018. The entirety of the above-mentioned patent application is hereby incorporated by reference herein and made a part of this specification.

BACKGROUND OF THE INVENTION

1. Field of the Invention

The invention relates to a carrier and a battery assembly, and more particularly, to a carrier and a battery assembly using the carrier.

2. Description of Related Art

With the rise of environmental awareness, the adoption of electric-driven vehicles (e.g., electric cars, electric vehicles and electric bicycles) has become the first choice for drivers, riders or passengers. Battery modules that provide power for electric vehicles, electric vehicles, and electric bicycles have become the most important link for related manufacturers.

A common battery module includes multiple battery assemblies. Each of the battery assemblies holds and secures one to three batteries by two carriers disposed in pairs. These batteries are connected in series or in parallel through electrode pieces. In general, in order to fix relative positions among the battery assemblies, the carriers of the battery assemblies are often secured by screws and the corresponding accessories, which are inconvenient for assembly.

SUMMARY OF THE INVENTION

The invention is directed to a carrier and a battery assembly using the carrier, which are very convenient for assembly.

The carrier of the invention includes a body, at least one first positioning structure and at least one second positioning structure. The body has a first side wall, a second side wall and a plurality of inserting grooves. The second side wall is opposite to the first side wall, and the inserting grooves are arranged side by side and located between the first side wall and the second side wall. The first positioning structure is disposed at the first side wall. The first positioning structure includes a first positioning protrusion and a second positioning protrusion connected to each other. The second positioning structure is disposed at the second side wall. The second positioning structure includes a first positioning recess and a second positioning recess communicating with each other. A geometric profile of the first positioning protrusion along a direction perpendicular to the first side wall is conformal with a geometric profile of the first positioning recess along a direction perpendicular to the second side wall. A geometric profile of the second positioning protrusion along the direction perpendicular to the first side wall is conformal with a geometric profile of the second positioning recess along the direction perpendicular to the second side wall.

The battery assembly of the invention includes a plurality of carriers and a plurality of batteries. The carriers are arranged side by side. Each of the carriers includes a body, at least one first positioning structure and at least one second positioning structure. The body has a first side wall, a second side wall and a plurality of inserting grooves. The second side wall is opposite to the first side wall, and the inserting grooves are arranged side by side and located between the first side wall and the second side wall. The first positioning structure is disposed at the first side wall. The first positioning structure includes a first positioning protrusion and a second positioning protrusion connected to each other. The second positioning structure is disposed at the second side wall. The second positioning structure includes a first positioning recess and a second positioning recess communicating with each other. A geometric profile of the first positioning protrusion along a direction perpendicular to the first side wall is conformal with a geometric profile of the first positioning recess along a direction perpendicular to the second side wall. A geometric profile of the second positioning protrusion along the direction perpendicular to the first side wall is conformal with a geometric profile of the second positioning recess along the direction perpendicular to the second side wall. The second positioning protrusion of one of the carriers and the second positioning protrusion of another one of the carriers face each other. The inserting grooves of one of the carriers are respectively aligned with the inserting grooves of another one of the carriers. Two opposite end portions of each of the batteries are respectively inserted to one of the inserting grooves of one of the carriers and another one of the inserting grooves of another one of the carriers.

Based on the above, the battery assembly of the invention includes a plurality of carriers, and each of the carriers has the same design for positioning structure and can provide excellent versatility and expandability. On the other hand, after aligning the positioning structures of any two carriers, the user may have these two carriers assembled in an assembling direction. On the contrary, the two carriers may be detached in an inverse direction of the assembling direction, and thus are very convenient for assembly and disassembly.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
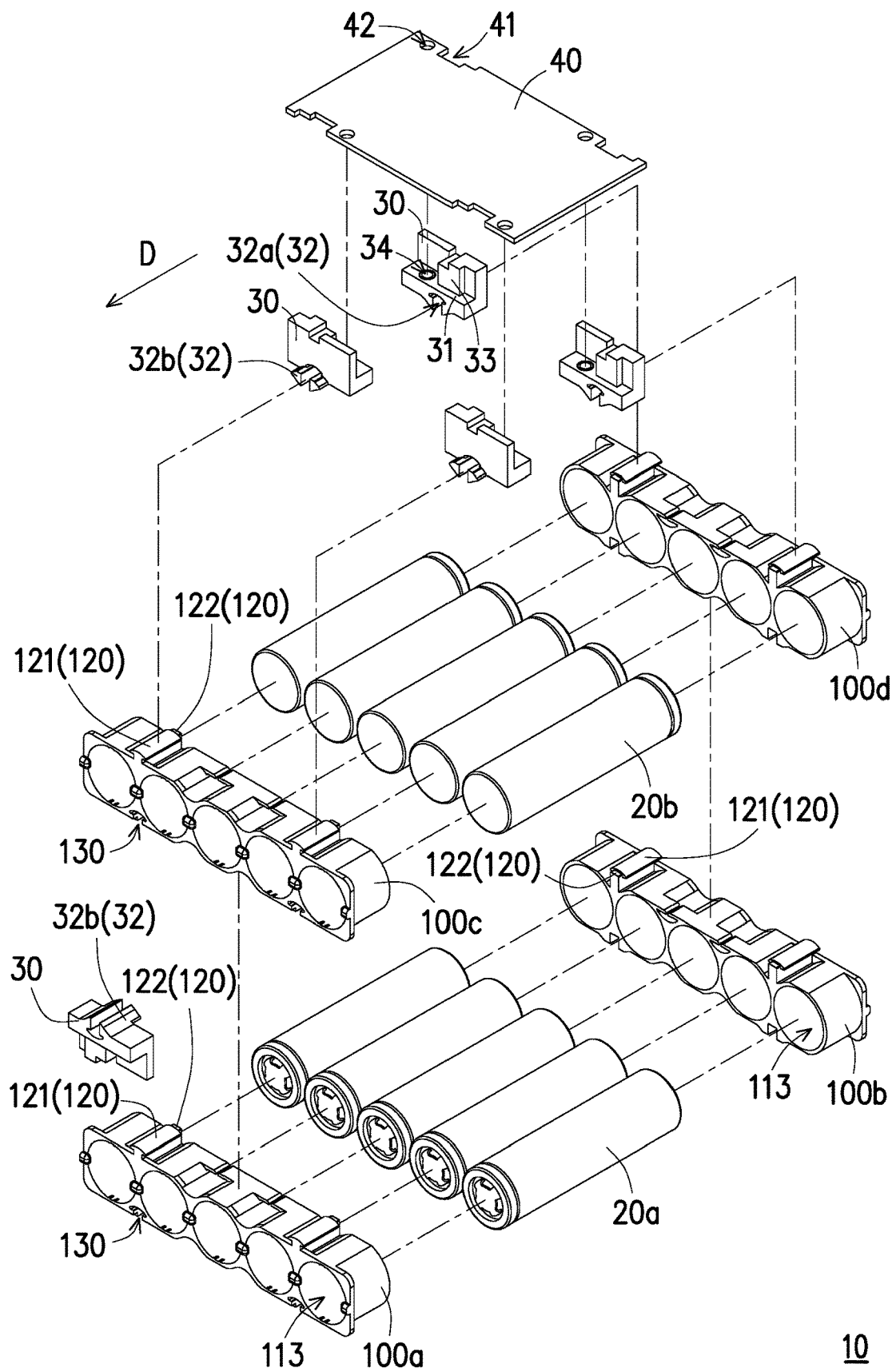
FIG. 1 is an explosion schematic view of a battery assembly in an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
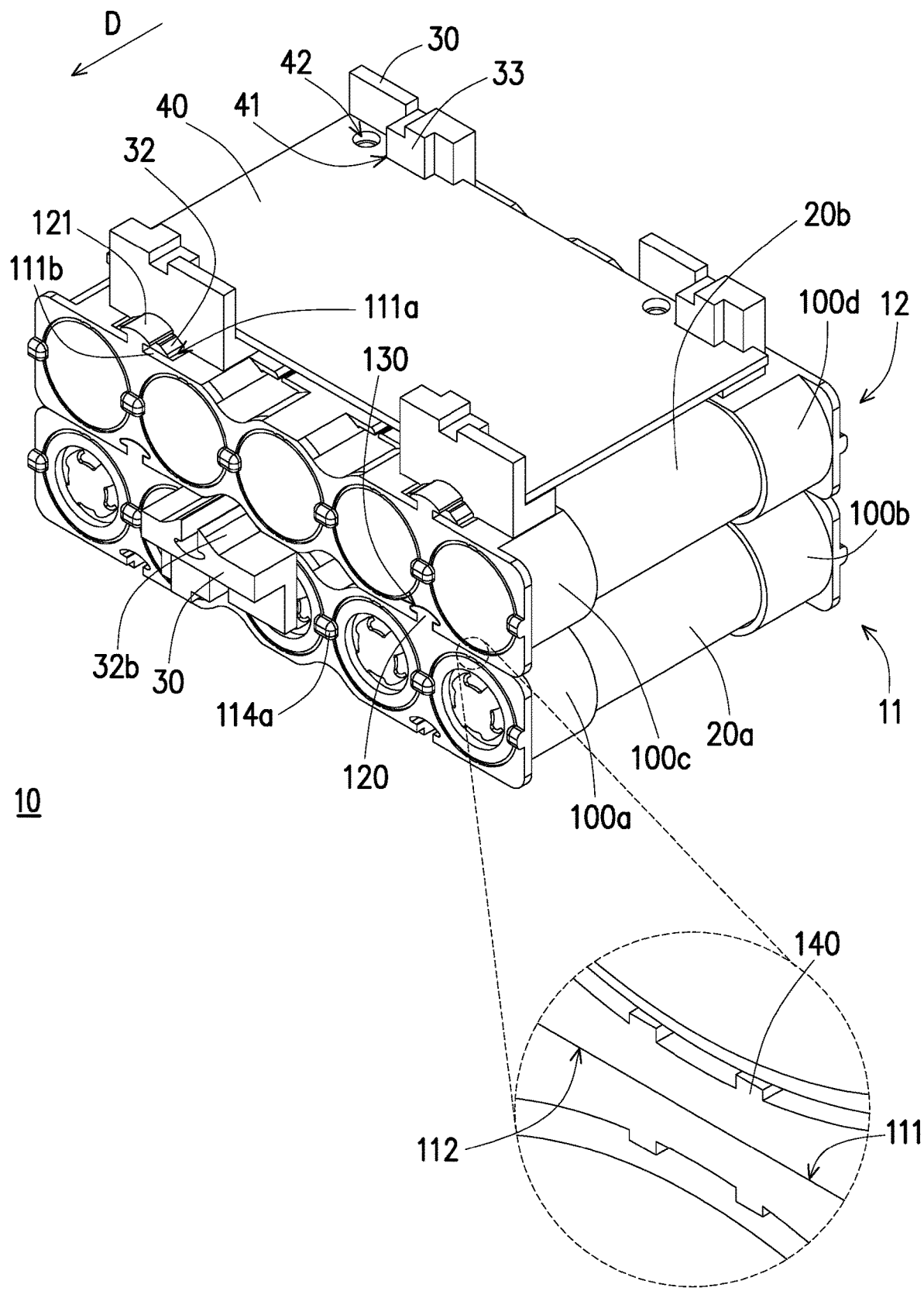
FIG. 2 is a schematic structural view of the battery assembly of FIG. 1.
Figure 3:
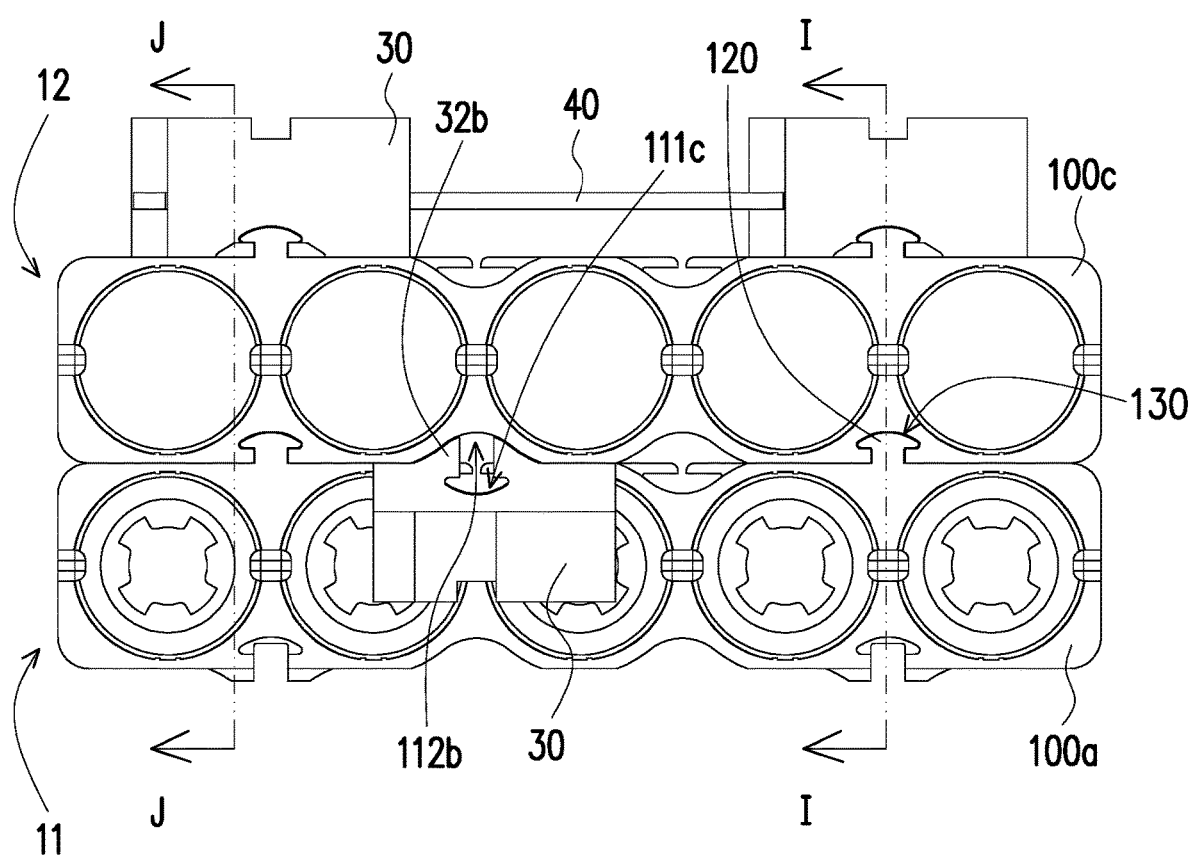
FIG. 3 is a front view of the battery assembly of FIG. 2.

FIG. 1 is an explosion schematic view of a battery assembly in an embodiment of the invention. FIG. 2 is a schematic structural view of the battery assembly of FIG. 1. FIG. 3 is a front view of the battery assembly of FIG. 2. With reference to FIG. 1 to FIG. 3, in this embodiment, a battery assembly 10 is applicable to electric cars, electric cars or electric bicycles for providing said vehicles power to move. More specifically, the battery assembly 10 may be formed by a first battery pack 11 engaged with a second battery pack 12. Here, the first battery pack 11 includes a first carrier 100a, a second carrier 100b and a plurality of first barriers 20a, and the second battery pack 12 includes a third carrier 100c, a fourth carrier 100d and a plurality of second batteries 20b. The first carrier 100a and the second carrier 100b are arranged side by side, and configured to hold and secure the first batteries 20a. Similarly, the third carrier 100c and the fourth carrier 100d are arranged side by side, and configured to hold and secure the second batteries 20b.

It should be noted that, although this embodiment is described with the battery assembly 10 including the first battery pack 11 and the second battery pack 12 as an example, the number of the battery packs is not particularly limited in the invention. Instead, the number of the battery packs may be increased or decreased depending on design of power storage capacity for the battery assembly.

In this embodiment, the first carrier 100a to the fourth carrier 100d have the same structural design and can provide excellent versatility and expandability. A structure design of the first carrier 100a and an assembling method of the battery assembly 10 will be described below. Because of the same structural design, description regarding the second carrier 100b to the fourth carrier 100d may correspondingly refer to the structural design of the first carrier 100a, which is not repeatedly described.

Figure 4:
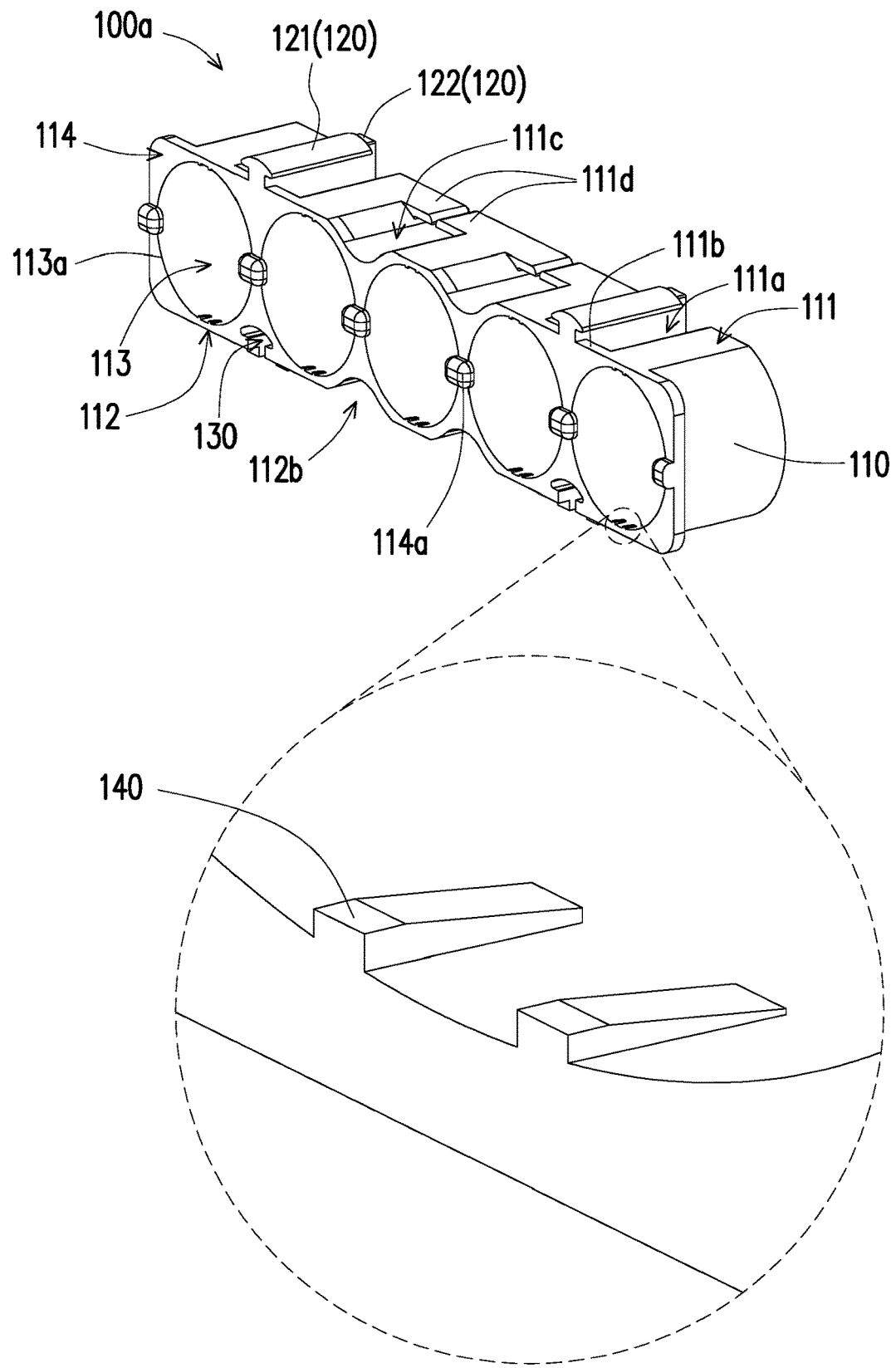
FIG. 4 is a schematic structural view of one of the carriers of FIG. 1 from another viewing angle.
Figure 5:
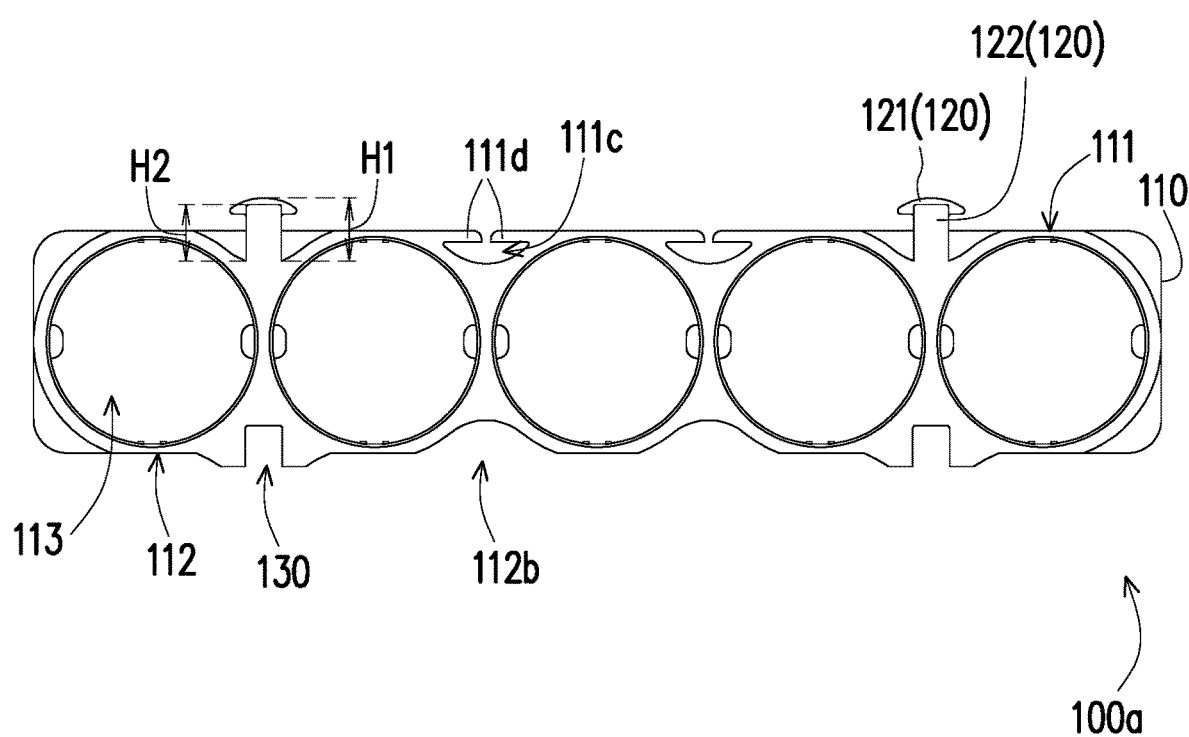
FIG. 5 is a front view of the carrier of FIG. 4.
Figure 6:
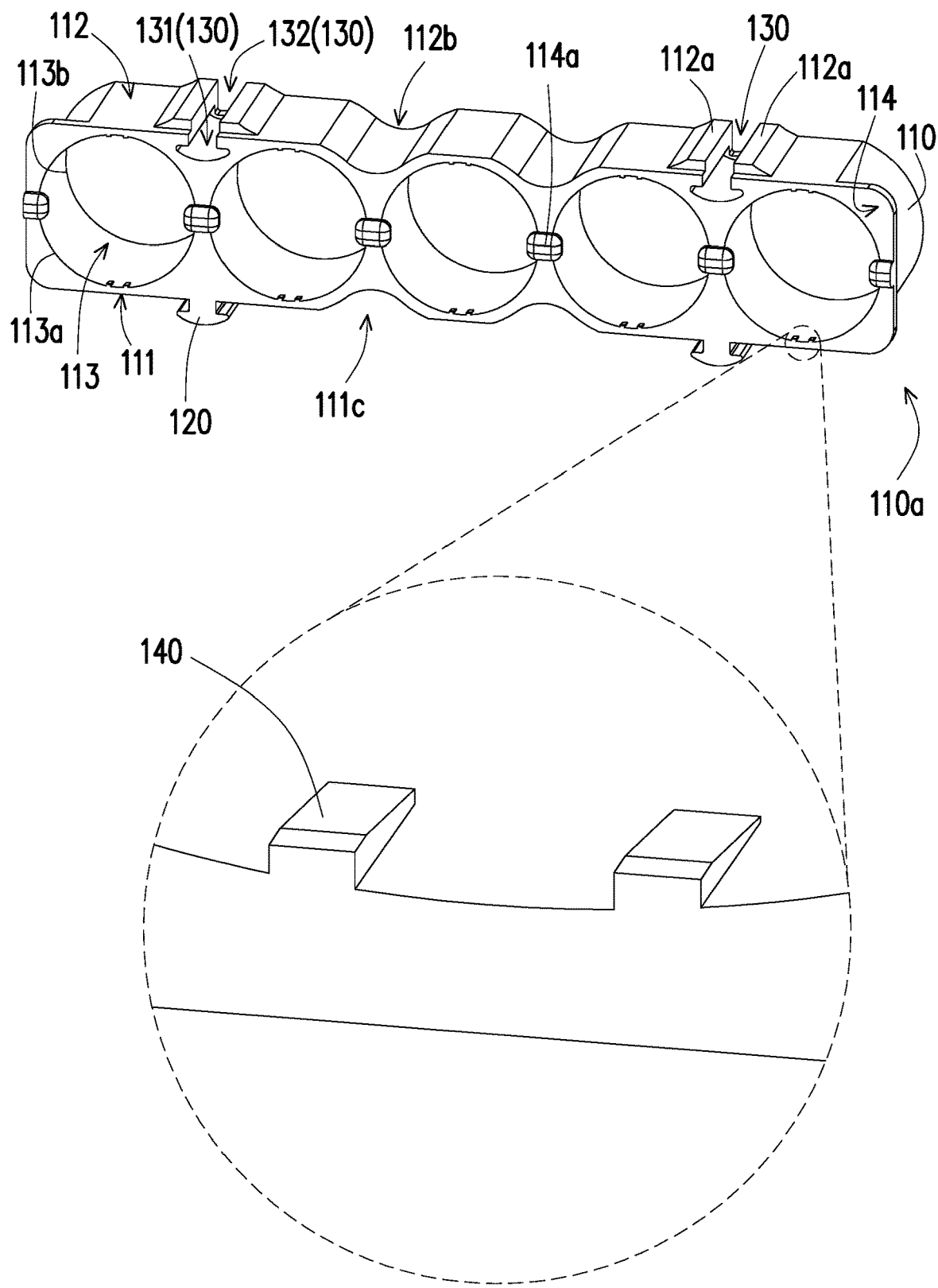
FIG. 6 is a schematic structural view of one of the carriers of FIG. 1 from yet another viewing angle.
Figure 7:
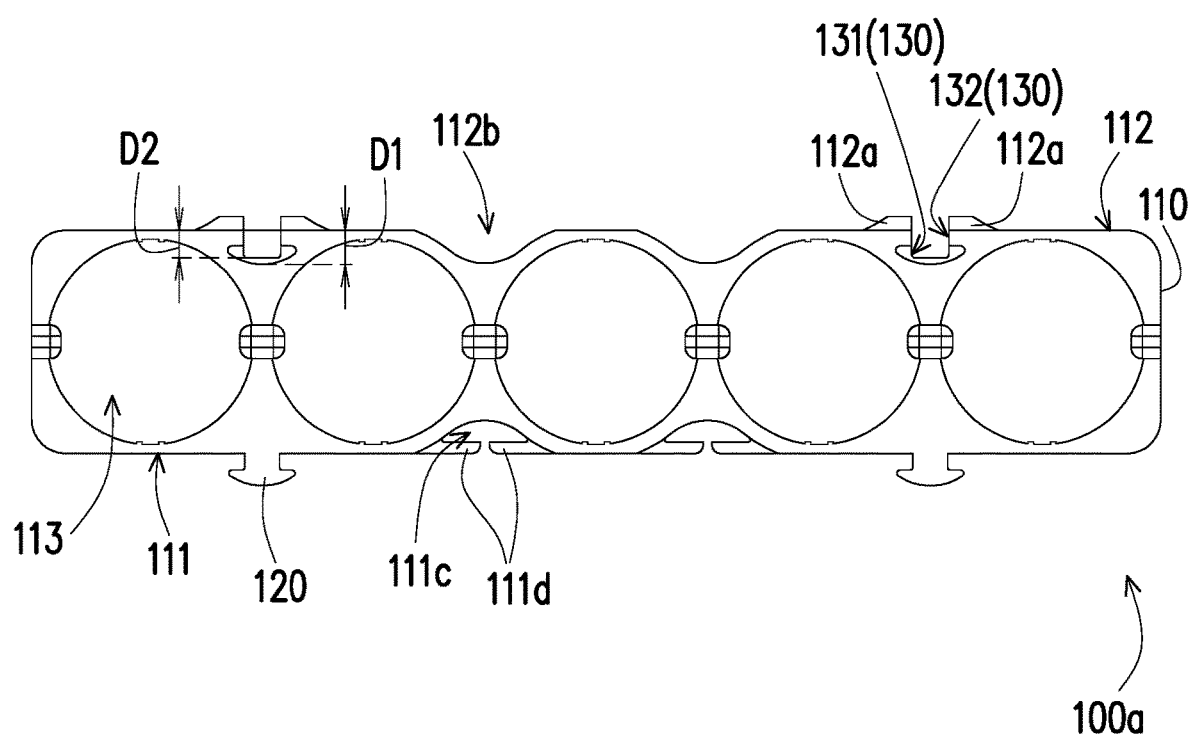
FIG. 7 is a front view of the carrier of FIG. 6.

FIG. 4 is a schematic structural view of one of the carriers of FIG. 1 from another viewing angle. FIG. 5 is a front view of the carrier of FIG. 4. FIG. 6 is a schematic structural view of one of the carriers of FIG. 1 from yet another viewing angle. FIG. 7 is a front view of the carrier of FIG. 6. With reference to FIG. 4 to FIG. 7, the first carrier 100a includes a body 110, at least one first positioning structure 120 and at least one second positioning structure 130. The number of the at least one first positioning structure 120 may be two, and the first positioning structures 120 are symmetrically disposed at one side of the body 110. The number of the at least one second positioning structure 130 may be two, and the second positioning structure 130 are symmetrically disposed at another side of the body 110. It should be noted that, the number of the at least one first positioning structure and the number of the at least one second positioning structure are not particularly limited in the invention. In other words, the number of the at least one first positioning structure and the number of the at least one second positioning structure may be increased or decreased depending on design requirements.

The body 110 has a first side wall 111, a second side wall 112 opposite to the first side wall 111 and a plurality of inserting grooves 113. Here, the second side wall 112 is substantially parallel to the first side wall 111, and the inserting grooves 113 are arranged side by side and located between the first side wall 111 and the second side wall 112. The first positioning structures 120 are disposed side by side on the first side wall 111, and the second positioning structures 130 are disposed side by side on the second side wall 112. The first positioning structures 120 are respectively aligned with the second positioning structures 130 along a direction perpendicular to the first side wall 111 or the second side wall 112. Such design helps to improve reliability when stacking and engaging the first carrier 100a with the third carrier 100c and reliability when stacking and engaging the second carrier 100b with the fourth carrier 100d, as shown in FIG. 1 to FIG. 3. In other embodiments, the first positioning structures may be staggered with respect to the second positioning structures along the direction perpendicular to the first sidewall or the second side wall, which are not particularly limited in the invention.

As shown in FIG. 4 and FIG. 5, each of the first positioning structures 120 may be a dovetail tenon, and may include a first positioning protrusion 121 and a second positioning protrusion 122 connected to each other. Each of the first positioning protrusions 121 has a first height H1, and each of the second positioning protrusions 122 has a second height H2 less than the first height H1. In other words, there is a step between each of the first positioning protrusions 121 and the corresponding second positioning protrusion 122. Here, the first height H1 is calculated from the bottom of each of the first positioning protrusions 121 connected to the body 110 to the top of the respective first positioning protrusion 121. Similarly, the second height H2 is calculated from the bottom of each of the second positioning protrusions 122 connected to the body 110 to the top of the respective second positioning protrusion 122. On the other hand, a geometric profile of each of the first positioning protrusions 121 along the direction perpendicular to the first side wall 111 is different from a geometric profile of the corresponding second positioning protrusion 122 along the direction perpendicular to the first side wall 111. Each of the second positioning protrusions 122 may be a square pillar, whereas each of the first positioning protrusions 121 may include a square pillar and a mushroom-like protrusion connected to the square pillar.

As shown in FIG. 6 and FIG. 7, each of the second positioning structures 130 may be a dovetail groove, and may include a first positioning recess 131 and a second positioning recess 132 communicating with each other. Each of the first positioning recesses 131 has a first depth D1, and each of the second positioning recesses 132 has a second depth D2 less than the first depth D1. In other words, there is a step between each of the first positioning recesses 131 and the corresponding second positioning recess 132. Here, the first depth D1 is calculated from a lateral surface of the body 110 to the bottom of each of the first positioning recesses 131. Similarly, the second depth D2 is calculated from the lateral surface of the body 110 to the bottom of each of the second positioning recesses 132. On the other hand, a geometric profile of each of the first positioning recesses 131 along the direction perpendicular to the second side wall 112 is different from a geometric profile of the corresponding second positioning recess 132 along the direction perpendicular to the second side wall 112. Each of the second positioning recesses 132 may be a square slot, whereas each of the first positioning recesses 131 may include a square slot and a mushroom-like recess connected to the square slot.

As shown in FIG. 1 and FIG. 2, the second positioning protrusions 122 of the first carrier 100a respectively face the second positioning protrusions 122 of the second carrier 100b, and the inserting grooves 113 of the first carrier 100a are respectively aligned with the inserting grooves 113 of the second carrier 100b. Two opposite end portions of each of the first batteries 20a are respectively inserted to one group of the inserting grooves 113 aligned with each other. In other words, the two opposite end portions of each of the first batteries 20a are respectively inserted to one of the inserting grooves 113 of the first carrier 100a and another one of the inserting grooves 113 of the second carrier 100b. Since the third carrier 100c, the fourth 100d and the second batteries 20b are disposed in the same manner as the first carrier 100a, the second carrier 100b and the first batteries 20a, and related description regarding the same is not repeated hereinafter.

As shown in FIG. 1 to FIG. 7, the geometric profile of each of the first positioning protrusions 121 along the direction perpendicular to the first side wall 111 is conformal with the geometric profile of the corresponding first positioning recess 131 along the direction perpendicular to the second side wall 112, and the geometric profile of each of the second positioning protrusions 122 along the direction perpendicular to the first side wall 111 is conformal with the geometric profile of the corresponding second positioning recess 132 along the direction perpendicular to the second side wall 112. On the other hand, the first depth D1 of each of the first positioning recesses 131 is greater than the second depth D2 of the corresponding second positioning recess 132.

Complementary relation between the geometrical profiles of each of the first positioning protrusions 120 and the corresponding second positioning protrusion 130 and design of the step between each of the first positioning recesses 131 and the corresponding second positioning recess 132 can help to improve reliability and convenience when stacking and engaging the first carrier 100a with the third carrier 100c and reliability and convenience when stacking and engaging the second carrier 100b with the fourth carrier 100d. Taking the first carrier 100a and the third carrier 100c stacked together as an example, the two overlap in the direction perpendicular to the first side wall 111 or the second side wall 112, and the first side wall 111 of the first carrier 100a faces the second side wall 112 of the third carrier 100c. Each of the first positioning protrusions 121 of the first carrier 100a is inserted to the corresponding first positioning recess 131 in the third carrier 100c, and each of the second positioning protrusions 122 of the first carrier 100a is inserted to the corresponding second positioning recess 132 in the third carrier 100c. Based on design of the step between each of the first positioning protrusions 121 and the corresponding second positioning protrusion 122 and the step between each of the first positioning recesses 131 and the corresponding second positioning recess 132, the third carrier 100c cannot be moved relative to the first carrier 100a along a direction D parallel to the first side wall 111 or the second side wall 112.

Figure 8:
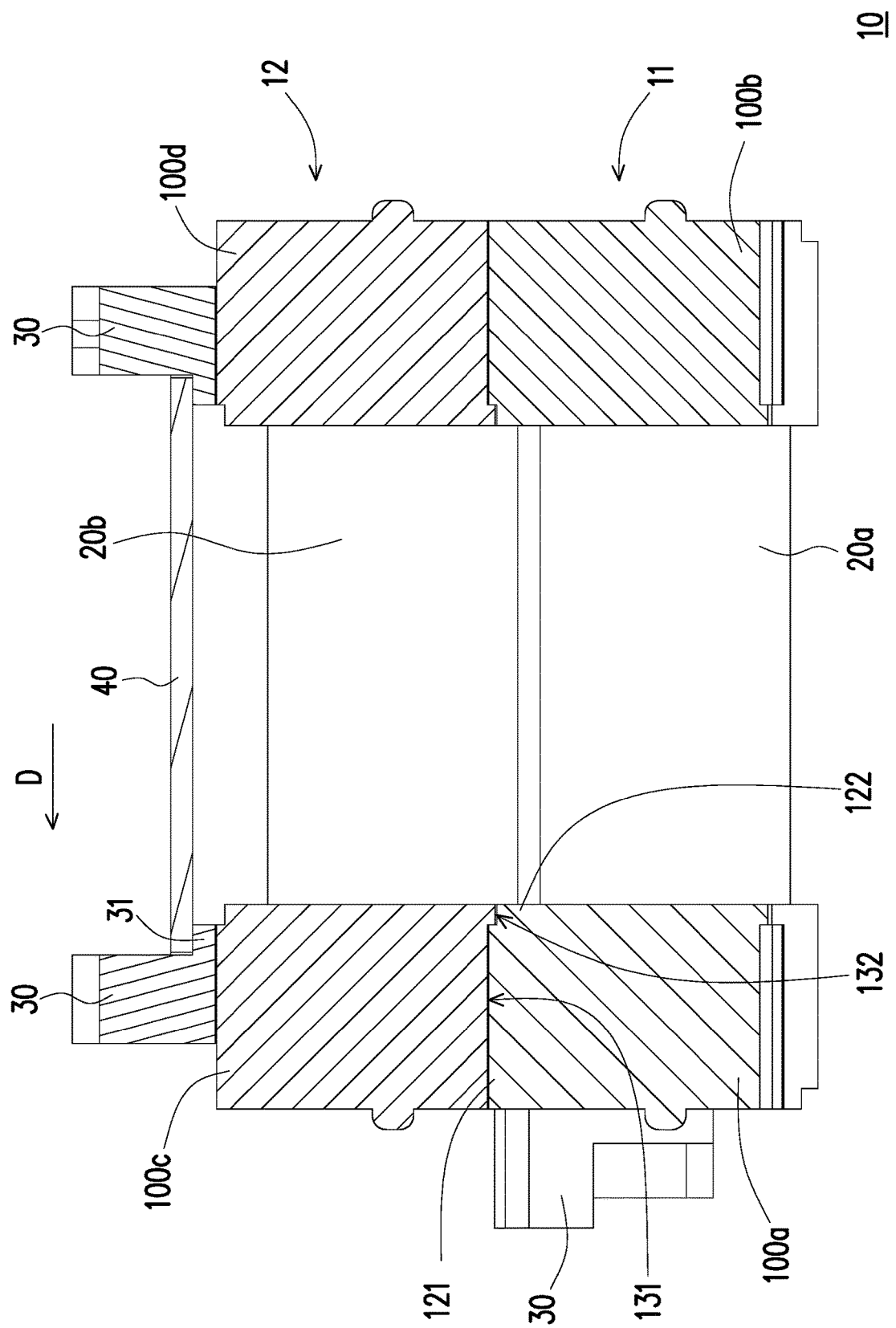
FIG. 8 is a cross-sectional view of FIG. 3 along line I-I.

FIG. 8 is a cross-sectional view of FIG. 3 along line I-I. With reference to FIG. 1 to FIG. 8, in the process of assembling the first carrier 100a and the third carrier 100c, each of the first positioning recesses 131 of the third carrier 100c needs to be aligned with the corresponding second positioning protrusion 122 in the first carrier 100a first. Next, the third 100c is moved relative to the first carrier 100a along the direction D parallel to the first side wall 111 or the second side wall 112. Meanwhile, each of the first positioning recesses 131 of the third carrier 100c is moved and passed through the corresponding second positioning protrusions 122 in the first carrier 100a. Then, due to design of the step between each of the first positioning protrusions 121 and the corresponding second positioning protrusion 122 and the step between each of the first positioning recesses 131 and the corresponding second positioning recess 132, the movement of the third carrier 100c relative to the first carrier 100a is stopped after each of the first positioning protrusions 121 of the first carrier 100a is completely contained in the corresponding first positioning recess 131 in the third carrier 100c. Meanwhile, each of the second positioning protrusions 122 of the first carrier 100a is also completely contained in the corresponding second positioning recess 132 in the third carrier 100c.

Because each of the first positioning protrusions 121 abuts against the step between the corresponding first positioning recess 131 and the second positioning recess 132, the third carrier 100c can no longer be moved relative to the first carrier 100a along the direction D parallel to the first side wall 111 or the second side wall 112. On the contrary, the third carrier 100c may be moved relative to the first carrier 100a in an inverse direction of the direction D to be detached.

Figure 9:
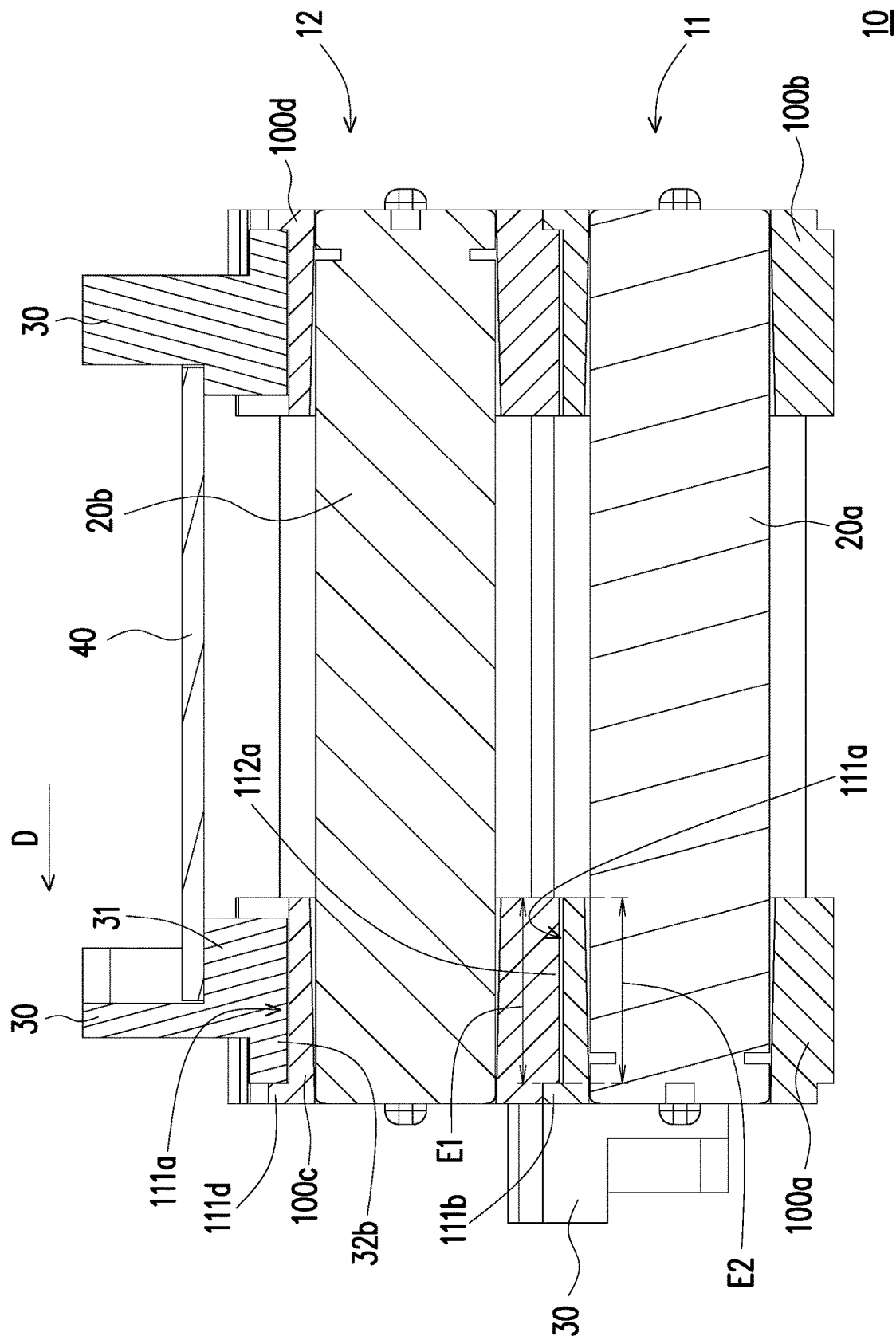
FIG. 9 is a cross-sectional view of FIG. 3 along line J-J.

FIG. 9 is a cross-sectional view of FIG. 3 along line J-J. With reference to FIG. 4 to FIG. 7 and FIG. 9, in this embodiment, the first side wall 111 of the first carrier 100a further includes at least two third positioning recesses 111a and at least two stoppers 111b. More specifically, one side of each of the first positioning structures 120 is disposed with one group of the third positioning recess 111a and the stopper 111b, and another side of each of the first positioning structures 120 is disposed with another group of the third positioning recess 111a and the stopper 111b. On the other hand, each of the stoppers 111b is disposed at one side of the corresponding third positioning recess 111a opposite to the second positioning protrusion 122. The second side wall 112 of the first carrier 100a further includes at least two third positioning protrusions 112a. More specifically, one side of each of the second positioning structures 130 is disposed with one of the third positioning protrusions 112a, and another side of each of the second positioning structures 130 is disposed with another one of the third positioning protrusions 112a. On the other hand, an extended length E1 of each of the third positioning protrusions 112a along the direction parallel to the first side wall 111 or the second side wall 112 is substantially equal to an extended length E2 of the corresponding third positioning recess 111a along the direction parallel to the first side wall 111 or the second side wall 112.

With reference to FIG. 1 to FIG. 7 and FIG. 9, each of the third positioning protrusions 112a of the third carrier 100 is inserted to the corresponding third positioning recess 111a in the first carrier 100a, and each of the third positioning protrusions 112a of the third carrier 100c abuts against the corresponding stopper 111b in the first carrier 100a. In the process of assembling the first carrier 100a and the third carrier 100c, each of the third positioning protrusions 112a of the third carrier 100c needs to be aligned with the corresponding third positioning recess 111a in the first carrier 100a first. Next, the third 100c is moved relative to the first carrier 100a along the direction D parallel to the first side wall 111 or the second side wall 112. Meanwhile, each of the third positioning protrusions 112a of the third carrier 100c is moved in the corresponding third positioning recess 111a of the first carrier 100a. Also, after each of the third positioning protrusions 112a of the third carrier 100c is completely contained in the corresponding third positioning recess 111a in the first carrier 100a and abuts against the corresponding stopper 111b, the third carrier 100c can no longer be moved relative to the first carrier 100a along the direction D. On the contrary, the third carrier 100c may be moved relative to the first carrier 100a in an inverse direction of the direction D to be detached.

With reference to FIG. 3 to FIG. 7, in this embodiment, the first side wall 111 of the first carrier 100a further includes at least one first groove 111c and at least two extended portions 111d. Here, the number of the at least one first groove 111c may be two, and the interior of each of the first grooves 111c may be disposed with two extended portions 111d. More specifically, the two extended portions 111d disposed in pair are respectively extended inwardly from the two opposite side edges of the corresponding first groove 111c, and a gap is kept between the two extended portions 111d disposed in pair for use in the subsequent process of routing. On the other hand, the second side wall 112 of the first carrier 100a is disposed with two second grooves 112b, and each of the first grooves 111c overlaps with the corresponding second groove 112b along the direction perpendicular to the first side wall 111 or the second side wall 112. In this way, after the first carrier 100a and the third carrier 100c are stacked and engaged, each of the first grooves 111c of the first carrier 100a is aligned with the corresponding second groove 112b in the third carrier 100c, and each of the first grooves 111c and the corresponding second groove 112b are communicating with each other.

With reference to FIG. 2, FIG. 4 and FIG. 6, the body of the first carrier 100a further includes a plurality of oblique bumps 140, and each of the inserting grooves 113 has a first opening 113a and a second opening 113b opposite to each other. The oblique bumps 140 are respectively disposed in the inserting grooves 113 adjacent to the first openings 113a and obliquely extended from the first openings 113a down towards the second openings 113b. Here, the end portion of each of the first batteries 20a inserted to the corresponding inserting groove 113 abuts against the corresponding oblique bump 140 to prevent each of the first batteries 20a from sliding out from the corresponding first opening 113a.

On the other hand, the body 110 of the first carrier 100a further includes a third side wall 114 connected to the first side wall 111 and the second side wall 112. Here, the third side wall 113 is perpendicularly connected to the first side wall 111 and the second side wall 112, and the inserting grooves 113 penetrate the third side wall 114 to respectively form the first openings 113a at the third side wall 114. The third side wall 114 of the body 110 is disposed with a plurality of limiting portions 114a respectively extended inwardly from side edges of the inserting grooves 113 (or extended into the first openings 113a). Here, the end portion of each of the first batteries 20a inserted to the corresponding inserting groove 113 abuts against the corresponding limiting portion 114a to prevent each of the first batteries 20a from sliding out from the corresponding first opening 113a.

It should be noted that, structural designs of the second carrier 100b to the fourth carrier 100d may refer the structural design of the first carrier 100a as described above. On the other hand, how the second carrier 100b and the fourth carrier 100d are stacked and engaged may also refer to how the first carrier 100a and the third carrier 100c are stacked and engaged as described above. Moreover, the battery assembly 10 of this embodiment is composed of the first battery pack 11 and the second battery pack 12 stacked and engaged together, and each of the battery packs includes at least five batteries. That is to say, each of the carriers has at least five inserting grooves. Such design helps to improve power storage capacity of the battery assembly 10.

With reference to FIG. 1, FIG. 2 and FIG. 9, the battery assembly 10 further includes a plurality of supporting members 30, detachably disposed on the second battery pack 12. Each of the supporting members 30 has a supporting portion 31 and an engaging portion 32 opposite to the supporting portion 31. Here, a part of the supporting members 30 is disposed at the first side wall 111 of the third carrier 100c, and another part of the supporting members 30 is disposed at the first side wall 111 of the fourth carrier 100d. More specifically, the engaging portion 32 of each of the supporting members 30 disposed at the first side wall 111 of the third carrier 100c is engaged with the corresponding first positioning protrusion 121 and abuts against the corresponding two stoppers 111b. Therefore, each of the supporting members 30 disposed at the first side wall 111 of the third carrier 100c will not be moved relative to the third carrier 100c along the direction D parallel to the first side wall 111 or the second side wall 112. The engaging portion 32 of each of the supporting members 30 disposed at the first side wall 111 of the fourth carrier 100d is engaged with the corresponding first positioning protrusion 121 and abuts against the corresponding two stoppers 111b. Therefore, each of the supporting members 30 disposed at the first side wall 111 of the fourth carrier 100d will not be moved relative to the first carrier 100a along the inverse direction of the direction D.

In this embodiment, the engaging portion 32 of each of the supporting members 30 has an engaging recess 32a and two engaging protrusions 32b located at two opposite sides of the engaging recess 32a, the engaging recess 32a of each of the supporting members 30 is sleeved on the corresponding first positioning protrusion 121, and the two engaging protrusions 32b of each of the supporting members 30 are respectively inserted to the corresponding two third positioning recesses Ill a and abut against the corresponding two stoppers 111b. On the other hand, the supporting portions 31 of the supporting members 30 face one another. Here, carrying surfaces of the supporting portions 31 used to carry a protection circuit module 40 all face the same side (e.g., at the same horizontal level), and are configured to commonly carry the protection circuit module 40 and prevent the protection circuit module 40 from tilting.

Each of the supporting members 30 further includes a limiting protrusion 33 connected to the carrying surface of the supporting portion 31, and the protection circuit module 40 has a plurality of limiting recesses 41. The limiting protrusions 33 of the supporting member 31 face one another, and the limiting recesses 41 are respectively sleeved on the limiting protrusions 33 so as to ensure that the protection circuit module 40 are steadily held and secured between the supporting members 30. On the other hand, a plurality of locking holes 42 can be opened on the protection circuit module 40, and the carrying surface of the supporting portion 31 of each of the supporting members 30 may be disposed with a plurality of locking holes 34. After the protection circuit module 40 is held and secured between the supporting members 30, the locking holes 42 may be respectively aligned with the locking holes 34, so a plurality of screws (not illustrated) may then be locked onto the locking holes 42 and the locking holes 32 aligned with each other to prevent the protection circuit module 40 from dropping off. On the other hand, the first batteries 20a and the second batteries 20b may be connected in series or in parallel through electrode pieces (not illustrated), and may be electrically connected to the protection circuit module 40.

It should be noted that, the two engaging protrusions 32b of each of the supporting members 30 are partially protruded, and may be configured to be inserted from the third side wall 114 of the corresponding carrier into the first groove 111c and the second groove 112b communicating with each other, as shown in FIG. 1 and FIG. 2. In this way, after the battery assembly 10 is placed into a shell cover (not illustrated), the battery assembly 10 may abut against inner walls of the shell cover (not illustrated) of shell cover (not illustrated) through the supporting members 30 to prevent the battery assembly 10 from sliding freely in the shell cover (not illustrated).

In summary, the battery assembly of the invention includes a plurality of carriers, and each of the carriers has the same design for positioning structure and can provide excellent versatility and expandability. On the other hand, after aligning the positioning structures of any two carriers, the user may have these two carriers assembled in an assembling direction. On the contrary, the two carriers may be detached in an inverse direction of the assembling direction, and thus are very convenient for assembly and disassembly. More specifically, after aligning the positioning structures of any two carriers, the user may have one of the two carriers moved relative to another carrier along the assembling direction. Further, once the positioning structures of any two carriers are engaged and moved in position, one of the corresponding two carriers can no longer be moved relative to another carrier along the assembling direction. Based on the positioning mechanism described above, reliability of the battery assembly of the invention may be improved to prevent each component from separating easily.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A battery assembly, comprising:
    a plurality of carriers arranged side by side, each of the carriers comprising:
        a body, having a first side wall, a second side wall and a plurality of inserting grooves, wherein the second side wall is opposite to the first side wall, and the inserting grooves are arranged side by side and located between the first side wall and the second side wall;
        at least one first positioning structure, disposed at the first side wall, wherein the first positioning structure comprises a first positioning protrusion and a second positioning protrusion connected to each other; and
        at least one second positioning structure, disposed at the second side wall, wherein the second positioning structure comprises a first positioning recess and a second positioning recess communicating with each other, a geometric profile of the first positioning protrusion along a direction perpendicular to the first side wall is conformal with a geometric profile of the first positioning recess along a direction perpendicular to the second side wall, and a geometric profile of the second positioning protrusion along the direction perpendicular to the first side wall is conformal with a geometric profile of the second positioning recess along the direction perpendicular to the second side wall,
        wherein each of the bodies further comprises a plurality of oblique bumps, each of the inserting grooves comprises a first opening and a second opening opposite to each other, and the oblique bumps are respectively disposed in the inserting grooves adjacent to the first openings and obliquely extended from the first openings down towards the second openings;
    a plurality of batteries, wherein the second positioning protrusion of one of the carriers and the second positioning protrusion of another one of the carriers face each other, the inserting grooves of one of the carriers are respectively aligned with the inserting grooves of another one of the carriers, and two opposite end portions of each of the batteries are respectively inserted to one of the inserting grooves of one of the carriers and another one of the inserting grooves of another one of the carriers; and
    a plurality of supporting members, each of the supporting members having a supporting portion and an engaging portion opposite to the supporting portion, each of the supporting members being disposed at the first side wall of the corresponding carrier,
    wherein the end portion of each of the batteries inserted to the corresponding inserting groove abuts against the corresponding oblique bump,
    wherein each of the first side walls further comprises at least two third positioning recesses and at least two stoppers, the two third positioning recesses of each of the first side walls are respectively located at two opposite sides of the first positioning structure, and one side of each of the third positioning recesses of each of the first side walls opposite to the second positioning protrusion is disposed with one of the stoppers,
    wherein the engaging portion of each of the supporting members is engaged with the corresponding first positioning protrusion and abuts against the corresponding two stoppers.

2. The battery assembly according to claim 1, wherein each of the first positioning protrusions has a first height, each of the second positioning protrusions has a second height less than the first height, each of the first positioning recesses has a first depth, and each of the second positioning recesses has a second depth less than the first depth,
    wherein the first side wall of one of the carriers and the second side wall of another one of the carriers face each other, the first positioning protrusion of one of the carriers is inserted to the first positioning recess of another one of the carriers, and the second positioning protrusion of one of the carriers is inserted to the second positioning recess of another one of the carriers.

3. The battery assembly according to claim 1, wherein each of the second side walls further comprises at least two third positioning protrusions, the two third positioning protrusions of each of the second side walls are respectively located at two opposite sides of the second positioning structure, and an extended length of each of the third positioning protrusions of each of the second side walls is equal to an extended length of each of the third positioning recesses,
    wherein the second side wall of one of the carriers and the first side wall of another one of the carriers face each other, the two third positioning protrusions of one of the carriers are respectively inserted to the two third positioning recesses of another one of the carriers, and the two third positioning protrusions of one of the carriers respectively abut against the two stoppers of another one of the carriers.

4. The battery assembly according to claim 1, wherein the engaging portion of each of the supporting members has an engaging recess and two engaging protrusions located at two opposite sides of the engaging recess, the engaging recess of each of the supporting members is sleeved on the corresponding first positioning protrusion, and the two engaging protrusions of each of the supporting members are respectively inserted to the corresponding two third positioning recesses and respectively abut against the corresponding two stoppers.

5. The battery assembly according to claim 1, wherein the supporting portions of the supporting members face one another, and the battery assembly further comprises a protection circuit module, commonly carried by the supporting portions.

6. The battery assembly according to claim 5, wherein each of the supporting members further comprises a limiting protrusion connected to the supporting portion, the protection circuit module has a plurality of limiting recesses, the limiting protrusions of the supporting members face one another, and the limiting recesses are respectively sleeved on the limiting protrusions.

7. The battery assembly according to claim 1, wherein each of the first side walls further comprises at least one first groove and at least two extended portions, each of the second side walls comprises at least one second groove opposite to the first groove, the two extended portions of each of the first side wall are respectively extended inwardly from two opposite side edges of the first groove, and a gap is kept between the two extended portions of each of the first side walls, wherein the first side wall of one of the carriers and the second side wall of another one of the carriers face each other, and the first groove of one of the carriers is aligned with the second groove of another one of the carriers.

8. The battery assembly according to claim 1, wherein each of the bodies further comprises a third side wall connected to the first side wall and the second side wall, the inserting grooves of each of the bodies penetrate through the third side wall, and the third side wall of each of the bodies is disposed with a plurality of limiting portions respectively extended inwardly from side edges of the inserting grooves, wherein the end portion of each of the batteries inserted to the corresponding inserting groove abuts against the corresponding limiting portion.

9. The battery assembly according to claim 1, wherein a number of the inserting grooves of each of the bodies is at least five.

* * * * *